US007995518B2

(12) United States Patent
Jacquet et al.

(10) Patent No.: US 7,995,518 B2
(45) Date of Patent: Aug. 9, 2011

(54) METHOD OF EXCHANGING INFORMATION UNDER IP PROTOCOL WITH DATA SUBSTITUTION IN THE TOS FIELD

(75) Inventors: Adeline Jacquet, Paris (FR); Robert Brive, Herouville (FR); Benjamin Declety, Billancourt (FR)

(73) Assignee: Sagem Defense Securite, Paris (FR)

( * ) Notice: Subject to any disclaimer, the term of this patent is extended or adjusted under 35 U.S.C. 154(b) by 1513 days.

(21) Appl. No.: 11/091,540

(22) Filed: Mar. 29, 2005

(65) Prior Publication Data

US 2005/0220015 A1  Oct. 6, 2005

(30) Foreign Application Priority Data

Mar. 30, 2004 (FR) ..................... 04 03279

(51) Int. Cl.
*H04W 4/00* (2009.01)
(52) U.S. Cl. .................. 370/328; 370/338; 370/469
(58) Field of Classification Search .............. 370/338, 370/252, 352, 471, 328, 474, 469; 709/227, 709/230, 249, 219, 229, 236, 238; 455/422.1; 726/4
See application file for complete search history.

(56) References Cited

U.S. PATENT DOCUMENTS

| 6,477,533 | B2 * | 11/2002 | Schiff et al. ................... 1/1 |
| 7,003,293 | B2 * | 2/2006 | D'Annunzio ............... 455/431 |
| 7,082,471 | B2 * | 7/2006 | Hericourt ................... 709/232 |
| 2003/0084174 | A1 | 5/2003 | D'Annunzio et al. |

OTHER PUBLICATIONS

Almquist, P., Network Working Group Request for Comments, XX, XX, Jul. 1992, pp. 1-25 XP002909776, p. 4.

* cited by examiner

*Primary Examiner* — Ricky Ngo
*Assistant Examiner* — Chandrahas Patel
(74) *Attorney, Agent, or Firm* — Muncy, Geissler, Olds & Lowe, PLLC

(57) ABSTRACT

A method of exchanging information by the Internet protocol in the form of datagrams each including a TOS field normally dedicated to receiving routing parameters. The method includes configuring network equipment to define an identification zone in the TOS field and associating equipment of a first type with identifiers that can be encoded in said identification zone. When a piece of equipment of the first type sends a datagram to a piece of equipment of the second type, the identifier of the piece of equipment of the first type in question is encoded in the identification zone. When the datagram is received by the equipment of the second type, it is first checked that the identifier appears in a table of authorized identifiers prior to accepting the datagram.

4 Claims, 1 Drawing Sheet

METHOD OF EXCHANGING INFORMATION UNDER IP PROTOCOL WITH DATA SUBSTITUTION IN THE TOS FIELD

The present invention relates to a method of exchanging information in a network using Internet protocol (IP).

BACKGROUND OF THE INVENTION

Internet protocol is a network layer protocol that is described, for example, in the Internet Engineering Task Force (IETF) technical report RFC 791.

In that protocol, information is transmitted in the form of datagrams each possessing a header containing in particular control parameters, routing parameters, and address parameters (IP addresses) enabling information to be routed between two pieces of network equipment. The routing parameters are contained in a type of service (TOS) field as defined in particular in technical reports RFC 1349 and RFC 1455 which specify the size of the field and the nature of the routing parameters (priority, reliability, quality, . . . ).

There exist airplanes having internal networks that make use of the Internet protocol. Such networks include a secure network used for operating the airplane itself and a public network of servers used in particular by the crew for obtaining information about a flight or passengers, the airports visited, . . . , and also to enable passengers to have access to entertainment means. The public network is not highly secure and it is connected to the secure network via a protection and routing device. The public network may also be connected via a conventional routing device to the Internet.

In order to avoid any possibility of the secure network being disturbed by datagrams coming from non-authorized equipment connected to the network having a low level of security, the protection and routing device is authorized to forward datagrams coming from the non-secure network only if it can itself identify the server that issued the datagram and can determine that the server is indeed one of the servers on-board the airplane.

To do this, a server issuing a datagram can be identified from the IP address of the datagram header or from the media access control (MAC) addresses that belong to each of the interfaces of the network elements and that appear in the network access layer datagram encapsulating the Internet protocol datagram. Nevertheless, when servers have a large number of interfaces designated by static or dynamic IP addresses, it becomes necessary for the protection and routing device connected to the secure network to have a large table associating each server with the IP addresses that correspond thereto. The same applies to the MAC addresses, since the protection and routing device is configured for being installed in a plurality of airplanes, each having its own servers, thus making it necessary for it to include a table containing the MAC addresses of all of the servers with which it might be connected. The use of such tables requires large computer resources that are not available in a protection and routing device connected to the secure network.

OBJECT OF THE INVENTION

An object of the invention is to provide a method of exchanging information by the Internet protocol in the form of datagrams having a TOS field normally dedicated to receiving routing parameters, the information traveling over a network including equipment of a first type and at least one piece of equipment of a second type, the method enabling equipment of the second type to identify in simple manner equipment of the first type that has sent it a datagram.

BRIEF DESCRIPTION OF THE INVENTION

To this end, the invention provides a method comprising the steps of:
 configuring the network equipment to define an identification zone in the TOS field;
 associating the equipment of the first type with identifiers that can be encoded in the identification zone of the TOS field;
 storing a table of authorized identifiers in the equipment of the second type; and
 when a datagram is issued by a piece of equipment of the first type for reception by the equipment of the second type, encoding the identifier of the piece of equipment of the first type in question in the identification zone, and on the datagram being received by the equipment of the second type, reading the identifier and checking whether it appears in the table of authorized identifiers before accepting the datagram.

The identifiers are associated with the pieces of equipment of the first type, e.g. as a function of the tasks performed thereby, or of the locations thereof in the network. The identifier then enables the equipment of the second type to determine whether it is authorized to receive and forward datagrams coming from equipment of the first type and regardless of the IP and MAC addresses of said equipment.

Preferably, the identification zone includes at least one normally-unused bit of the TOS field.

Since this bit is not used for receiving routing parameters, making use of it has no effect on network performance.

Advantageously, the network is connected by a routing device to an external network, and the method includes the step, on the routing device receiving a datagram coming from the external network, of encoding a non-authorized identifier in the bits of the TOS field that correspond to the identification zone.

Thus, datagrams coming from the external network include a non-authorized identifier so they are rejected by the equipment of the second type.

Preferably, the method includes a step of organizing the equipment of the first type in groups, each containing at least one piece of equipment of the first type, the identifiers being associated with the groups.

The distribution of the equipment of the first type in groups is particularly advantageous when the number of pieces of equipment of the first type is greater than the number of identifiers that can be encoded in the identification zone of the TOS field. Organizing the equipment of the first type in groups and allocating an identifier to each group then makes it possible to reduce the number of identifiers needed.

BRIEF DESCRIPTION OF THE DRAWINGS

Other characteristics and advantages of the invention appear on reading the following description of a particular, non-limiting implementation of the invention.

Reference is made to the sole accompanying FIGURE which is a diagrammatic view of a network implementing the method of the invention.

DETAILED DESCRIPTION OF THE INVENTION

Figure 1:
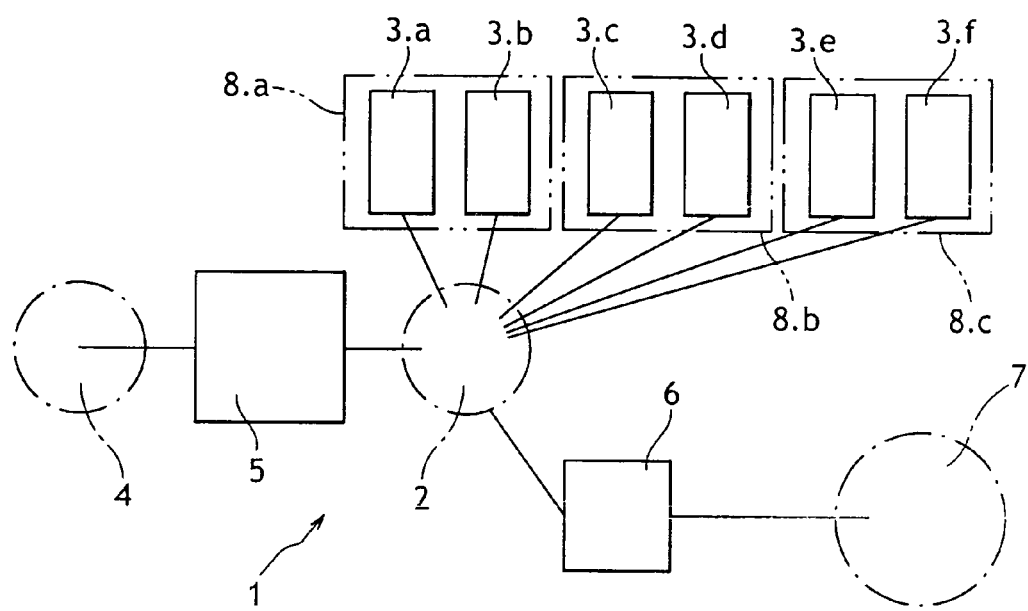

With reference to the FIGURE, the method of the invention is described herein in association with a network given overall reference 1 and located on board an airplane, for example.

The network 1 comprises a network 2 of servers 3.a to 3.f, and a secure network 4 connected to the network 2 by a protection and routing device 5. The protection and routing device 5 is known in itself and comprises a router associated with a demilitarized zone (DMZ) type filter element. The security level of the network 2 is lower than that of the secure network 4.

The network 2 is also connected by a router 6 to an internal network, in this case the Internet 7.

The network described operates using version 4 of the Internet protocol (IP) which provides for information being exchanged in the form of IP datagrams each having a header containing control, routing, and addressing parameters.

The method of the invention includes the step of organizing the servers 3.a to 3.f into three groups 8. The group 8.a comprises the servers 3.a and 3.b, the group 8.b comprises the servers 3.c and 3.d, and the group 8.c comprises the servers 3.e and 3.f.

Each group 8.a, 8.b, and 8.c is associated with an identifier encoded on two bits, respectively 01, 11, 10.

The servers 3.a to 3.c are configured to define an identification zone in the TOS field of the IP datagrams, which identification zone comprises the last two bits of this field (where the last bit is a bit that is normally unused).

A table of authorized identifiers is stored in the protection and routing device 5.

When a datagram is issued by one of the servers, e.g. the server 3.a for the secure network 4, the identifier 01 of the group 8.a with which the server 3.a is associated is encoded in the identification zone of the TOS field of the datagram.

The datagram is sent to the protection and routing device 5.

When the protection and routing device 5 receives the datagram 5, the identifier is read and the protection and routing device 5 is configured to check whether the identifier appears in the table of authorized identifiers.

If the identifier does appear in the table, then the datagram is accepted and forwarded to the secure network 4. Otherwise, the datagram is eliminated.

On receiving a datagram coming from the Internet 7, the router 6 is configured to encode a Hon-authorized identifier in the bits of the TOS field corresponding to the identification zone (i.e. the last two bits of this field). Specifically, the router 6 sets these bits to zero. Thus, each datagram coming from the Internet 7 cannot be forwarded as far as the network 4.

It should be observed that the TOS field is not used in conventional manner in the network 4, at least the last two bits of this field are not used.

Naturally, the invention is not limited to the embodiment described and variations can be made thereto without going beyond the ambit of the invention as defined by the claims.

In particular, the architecture of the network may be different from that described. Thus, the network 2 may have some other number of servers and/or other pieces of equipment, and the number of groups could be different depending on the number of servers, or more generally on the number of pieces of network equipment 2 and on the number of bits used in the identification zone on the TOS field. This number of bits need not be two, and it is limited only by the size of the TOS field. The number of pieces of equipment included within a group can vary from one group to another.

In addition, the network 1 may be more complex. The networks 2 and 4 may be connected to each other via two protection and routing devices that are connected in selective manner, and optionally in alternating manner, to the network 4, and via two routing devices each connected to both protection and routing devices and to the network 2. This configuration makes it possible to have a backup routing device in the event of one of the two routing devices failing.

What is claimed is:

1. A method of exchanging information by the Internet protocol in the form of datagrams each including a type of service (TOS) field normally dedicated to receiving routing parameters, the information traveling over a network comprising equipment of a first type, and at least one piece of equipment of a second type, the method comprising the steps of:
    configuring the network equipment to define an identification zone in the TOS field;
    associating the equipment of the first type with identifiers that are encoded in the identification zone of the TOS field;
    storing a table of authorized identifiers in the equipment of the second type; and
    when a datagram is issued by a piece of equipment of the first type for reception by the equipment of the second type, encoding the identifier of the piece of equipment of the first type in the identification zone, and on the datagram being received by the equipment of the second type, reading the identifier and checking whether it appears in the table of authorized identifiers before accepting the datagram,
    wherein the equipment of the first type is a public network, the equipment of the second type is a secure network and the network is located on an aircraft.

2. A method according to claim 1, wherein the identification zone includes at least one normally-unused bit of the TOS field.

3. A method according to claim 1, wherein the network is connected by a routing device to an external network, and the method includes the step, on the routing device receiving a datagram coming from the external network, of encoding a non-authorized identifier in the bits of the TOS field that correspond to the identification zone.

4. A method according to claim 1, including a step of organizing the equipment of the first type in groups each containing at least one piece of equipment of the first type, and wherein the identifiers are associated with the groups.

* * * * *